(12) United States Patent
Kimmel et al.

(10) Patent No.: US 9,173,417 B2
(45) Date of Patent: Nov. 3, 2015

(54) COFFEE AND DAIRY LIQUID CONCENTRATES

(75) Inventors: Jennifer Louise Kimmel, Evanston, IL (US); Philip Oxford, Chicago, IL (US)

(73) Assignee: Intercontinental Great Brands LLC, East Hanover, NJ (US)

(*) Notice: Subject to any disclaimer, the term of this patent is extended or adjusted under 35 U.S.C. 154(b) by 1256 days.

(21) Appl. No.: 12/258,578

(22) Filed: Oct. 27, 2008

(65) Prior Publication Data

US 2010/0104711 A1 Apr. 29, 2010

(51) Int. Cl.
*A23F 5/24* (2006.01)
(52) U.S. Cl.
CPC ...................................... *A23F 5/243* (2013.01)
(58) Field of Classification Search
CPC ........................................................ A23F 5/243
See application file for complete search history.

(56) References Cited

U.S. PATENT DOCUMENTS

| | | | |
|---|---|---|---|
| 2,340,989 A | 2/1944 | Salkin | |
| 5,260,085 A | 11/1993 | Wisler et al. | |
| 6,060,105 A | 5/2000 | Meister et al. | |
| 6,447,830 B1 | 9/2002 | Cevallos et al. | |
| 6,548,101 B2 | 4/2003 | Cevallos et al. | |
| 6,669,973 B1 | 12/2003 | Jolivet | |
| 7,887,864 B2 | 2/2011 | Cale | |
| 2002/0119236 A1* | 8/2002 | Yokoo et al. | 426/594 |
| 2002/0192351 A1 | 12/2002 | Cevallos | |
| 2004/0170727 A1 | 9/2004 | Howard et al. | |
| 2007/0172548 A1 | 7/2007 | Cale et al. | |
| 2008/0260911 A1 | 10/2008 | Matsubara et al. | |

FOREIGN PATENT DOCUMENTS

| | | |
|---|---|---|
| CA | 2 084 332 A1 | 6/1993 |
| CN | 101720838 A | 6/2010 |
| EP | 0 457 002 A1 | 11/1991 |
| EP | 0788744 | 8/1997 |
| EP | 0893065 | 1/1999 |
| EP | 1 048 220 A1 | 11/2000 |
| EP | 0 546 200 B2 | 6/2002 |
| EP | 1 129 624 B1 | 5/2003 |
| EP | 1 034 703 B1 | 6/2003 |
| EP | 1 618 790 A1 | 1/2006 |
| EP | 1 856 982 A1 | 11/2007 |
| EP | 2179658 A1 | 4/2010 |
| GB | 1 130 129 A | 10/1968 |
| GB | 1 415 844 A | 11/1975 |
| JP | 11-056244 A | 3/1999 |

(Continued)

OTHER PUBLICATIONS

R. F. Hurrell, R A. Finot, and J. L Cuq, Protein-polyphenol reactions 1. Nutritional and metabolic consequences of the reaction between oxidized caffeic acid and the lysine residues of casein, Br. J. Nutr. (1982), 47, 191-211.

(Continued)

*Primary Examiner* — Jenna A Watts
(74) *Attorney, Agent, or Firm* — Fitch, Even, Tabin & Flannery LLP

(57) ABSTRACT

Blended fluid concentrates are provided that can be reconstituted into an instant coffee plus dairy beverage using either hot or cold liquids. The blended fluid concentrates include a blend of at least a dairy component, a coffee component, and a stabilizing component to form a shelf-stable pourable liquid.

23 Claims, 2 Drawing Sheets

(56) References Cited

FOREIGN PATENT DOCUMENTS

| | | |
|---|---|---|
| JP | 2000316477 A | 11/2000 |
| JP | 2006-141358 A | 6/2006 |
| JP | 2008507285 A | 3/2008 |
| SI | 21538 A | 2/2005 |
| WO | 2006012506 A1 | 2/2006 |
| WO | 2006/064756 A1 | 6/2006 |
| WO | 2006/080490 A1 | 8/2006 |
| WO | 2008057224 | 5/2008 |

OTHER PUBLICATIONS

J. E. O'Connell et al., Effects of Tea, Coffee and Cocoa Extracts on the Colloidal Stability of Milk and Concentrated Milk, International Dairy Journal (1998) 8, 689-693.

John E. O'Connell and Patrick F. Fox, Effects of phenolic compounds on the heat stability of milk and concentrated milk, Journal of Dairy Research (1999) 66, 399-407.

J. E. O'Connell and P. F. Fox, Proposed mechanism for the effect of polyphenols on the heat stability of milk, International Dairy Journal (1999) 9, 523-536.

J. E. O'Connell and P. F. Fox, Significance and applications of phenolic compounds in the production and quality of milk and dairy products: a review, International Dairy Journal (2001) 11, 103-120.

Elisabeth Jöbstl et al., Noncovalent Cross-Linking of Casein by Epigallocatechin Gallate Characterized by Single Molecule Force Microscopy, Journal of Agricultural and Food Chemistry, 2006, vol. 54, No. 12, 4077-4081.

European Search Report for EP Application No. 09252477, dated Mar. 2, 2010.

R. L. Bradley, Jr. and T. M. Rexroat, Acceptance and stability of chocolate and strawberry fountain syrups made with concentrated, decolorized, deionized hydrolyzed whey permeate, Journal of Food Processing & Preservation, 1988, 12 (2), 163-170 (Abstract, 1 page).

A. A. Lapshin et al., Increasing the extraction efficiency of a coffee-chicory mixture during the production of a coffee-flavoured canned milk product, XIX International Dairy Congress, 1974, 1E, 756-758 (Abstract, 1 page).

M. R. Srinivasan et al., Studies on producing, packaging and storage of 'tea complete'—a formulated product consisting of tea, milk solids and sugar, International Dairy Congress (18th, Sydney), 1970, 1E (Abstract, 1 page).

Anonymous, Cool coffee cravings. (Iced Cappuccino concentrate from Autocrat of the US.), Dairy Field, March (Date Unknown), 180 (3), 33 (Abstract, 1 page).

Lyle's Coffee Syrup Selections—Coffee Syrup Sticks, Tate & Lyle, Aug. 24, 2006 (Abstract, 1 page).

Jetcafe—Mocha Blender Frappes, Extreme Foods, Dec. 18, 2003 (Abstract, 1 page).

Torani Caffioco—Liquid Coffee Mix, Torani Italian Syrups, Apr. 30, 2002 (Abstract, 1 page).

Meiji—Liquid Coffee, Meiji Seika Kaisha, Feb. 21, 2002 (Abstract, 1 page).

Swiss Miss Sweet Moments—Liquid Chocolate Flavored Drink Base, Hunt-Wesson, Dec. 11, 2001 (Abstract, 1 page).

Nescafe Bombon Cafe Con Leche Condensada, Nestle, Apr. 21, 2003 (Abstract, 1 page).

\* cited by examiner

Dairy Solids and Coffee Fluid Concentrates

Dairy Protein and Coffee Fluid Concentrates

Stabilizer and Coffee Levels

COFFEE AND DAIRY LIQUID CONCENTRATES

FIELD

The field relates to beverage concentrates and, in particular, shelf stable blended coffee and dairy fluid concentrates.

BACKGROUND

Instant coffee products including blends of coffee and dairy are commonly provided in one of three forms: a dry powdered mix, a ready-to-drink beverage (RTD), or a concentrated liquid. When blending coffee and dairy ingredients in a single product, however, the instability of these two components can pose difficulties in forming an organoleptically pleasing shelf stable product. Each particular form of the product has shortcomings that either render them challenging to manufacture in a stable form or result in a final beverage less than organoleptically desirable from a consumer standpoint.

Dry powdered mixes with both dry coffee solids and dried creamers are available under various brand names. These powdered mixes are reconstituted into a beverage by adding an appropriate amount of a liquid to form a coffee plus dairy beverage drink. Dry powdered mixes, however, are generally not well accepted by some consumers because they have a lower perception of freshness due to the use of dried creamers. Powdered mixes can also have poor solubility in water, particularly in cold water, which results in a limited amount of coffee solids or dry creamer that can be provided in the mix. A high amount of coffee solids often results in an increased acidity to the resulting beverage, which may cause flocculation or dairy particles dropping out of solution upon reconstitution.

RTD coffee plus dairy beverages are also commercially available, but due to the mass and volume of water in each serving, these beverages can be bulky and not easily portable. Moreover, it is also common to include high amounts of buffering salts (for example, sodium and potassium phosphates, citrates, and the like) or bulking agents (for example, sugars, salts, gums, and the like) in the RTD beverage to increase the heat stability and minimize feathering (such as transient feather-like forms on the surface of the beverage) of the dairy ingredients during beverage manufacture. Such amounts of additional ingredients, including flavorings, are often added to RTD drink formulations in order to deliver a product that remains stable. However, these RTD beverages are not always viewed as authentic coffee beverages due to their organoleptic character.

Concentrated liquids are another option to provide an instant coffee plus dairy beverage. In this form, the coffee and dairy ingredients are provided in a concentrated liquid that is diluted or reconstituted by the consumer to the desired final beverage. Prior coffee plus dairy liquid concentrates can also have stability problems that result in gelation and/or protein agglomeration during sterilization or during an extended shelf life. Additionally, the presence of high levels of lactose can result in Maillard reactions that may cause browning. As a result, it is common, in some cases, to find dairy plus coffee concentrates limiting the amount of dairy and/or coffee solids in the concentrate to minimize these problems, or the manufacturer simply warns the consumer that the concentrate only has a limited shelf life, such as three months or less.

Prior liquid dairy plus coffee concentrates commonly utilize cream, whole milk, or skim milk in either a condensed or evaporated form as the dairy ingredient. The use of condensed or evaporated milk in the prior concentrates also has shortcomings. Condensed or evaporated dairy products are simply a concentrated form of the starting dairy milk and, therefore, include all of the components in the same relative amounts as the starting dairy milk. Condensed or evaporated milk, therefore, includes large amounts of lactose and various dairy minerals. As discussed above, lactose and minerals can form instabilities in dairy concentrates. In addition, the condensing and evaporating process is also known to produce undesired organoleptic notes, such as a cooked milk flavor.

As mentioned above, with the prior condensed or evaporated dairy ingredients, a large portion of the dairy solids includes lactose and other minerals in the same ratio as in the starting dairy milk source. For example, prior concentrates using evaporated or condensed milk typically have about 26 percent protein based on the weight of the total dairy solids and about 40 percent lactose based on the weight of the total dairy solids. If high levels of dairy proteins are desired in a concentrate using evaporated or condensed milk, the concentrated dairy component also provides corresponding high levels of lactose and minerals (because condensed and evaporated milk have these ingredients in the same relative amount as the milk source), which, as discussed above, can cause instability problems in the concentrate.

Attempts to improve the stability of coffee plus dairy concentrates using condensed or evaporated milk have included incorporation of additional components into the concentrate. In some cases, glycerine, mono- and diglycerides, carrageenin, pectin, or coffee aroma ingredients have been added to the concentrate in an attempt to help stabilize the dairy plus coffee product. However, the use of large amounts of these additives provides complexity to the manufacturing process, additional expense to the formula, and can result in unexpected organoleptic characteristics and textures in the resulting beverage. In other cases, the coffee solids and dairy components may be sold as separate packets that are later combined by the user. However, such component separation necessitates the packaging and sale of two individual components that the consumer must mix together.

In order to minimize the bulk and weight of the concentrate, it is often desired to provide a high level of concentration by increasing the level of solids in the product. However, simply increasing the coffee and/or dairy solids of existing formulations not only encounters the organoleptic and manufacturing issues discussed above, but also typically forms a gel-like or pudding consistency of the final product. This texture is not well accepted by consumers in a beverage product because they are expecting a pourable liquid.

Accordingly, prior formulations of coffee and dairy concentrates are generally limited in the amount of dairy protein and/or the amount of coffee solids that can be formed into a stable and fluid concentrate. For example, prior dairy plus coffee concentrates are generally limited to about 15 percent or less coffee solids, but also less than about 28 percent non-fat milk solids. However, since prior concentrates rely on the use of evaporated or condensed milk (which have dairy proteins, lactose, and minerals in the same relative percentages as the starting milk source), these concentrates are also limited in the amount of dairy protein that can be included in a shelf stable and fluid concentrated beverage generally due to the undesirably high levels of lactose in these beverages. For instance, as non-fat milk solids is generally about 37 percent protein, 54 percent lactose, and 8 percent other minerals, these prior concentrates are generally limited to a formulation having about 10 percent or less dairy protein, contain about 15 percent lactose, and up to about 3 percent other minerals at the same time. In other words, prior concentrates are about 37 percent protein relative to the non-fat milk solids components and about 54 percent lactose relative to the non-fat milk solids components. As discussed above, these levels of lactose and minerals can result in undesired problems in highly concentrated products, or require additional unwanted ingredients for stability.

SUMMARY

Blended fluid concentrates and methods of making thereof are provided where the blended fluid concentrate can be reconstituted into an instant coffee plus dairy beverage using either hot or cold liquids. The blended fluid concentrate may include a blend of at least a fluid dairy component, a coffee component, a stabilizing or buffering component, and optional mouthfeel enhancers in amounts effective to maintain the blended fluid concentrate as a heat-stable and shelf-stable pourable liquid with acceptable taste and mouthfeel.

In one aspect, the fluid dairy component is preferably obtained from an ultrafiltered and, most preferably, an ultrafiltered and diafiltered liquid dairy source to concentrate the dairy solids and remove lactose and other minerals. When reconstituted, because the fluid dairy component is obtained from a liquid dairy source that has not been subjected to a condensing or evaporating process, the resulting blended fluid concentrate exhibits fresh, milky, and/or creamy dairy notes similar to traditional coffee products with fresh milk or cream added therein. In addition, because the fluid dairy component is preferably ultrafiltered and diafiltered to remove lactose and other minerals, the blended fluid concentrate can include increased amounts of dairy proteins and coffee solids and still remain stable during heat treatment and through an extended shelf life because the increased protein content does not result in a corresponding increase in lactose and minerals as with the prior evaporated and condensed milk products.

As compared to prior concentrates, the blended fluid concentrates herein using ultrafiltered dairy components have an increased dairy protein content relative to the non-fat dairy solids and a lower amount of dairy sugars and minerals relative to the non-fat dairy solids. At the same time, the blended fluid concentrates also have an increased amount of the coffee component, but even with such increased protein and coffee amounts, the blended fluid concentrates described herein still remain stable and pourable throughout processing heat treatments used during manufacturing as well as throughout the extended shelf life of the product.

In another aspect, the stabilizing component in the blended fluid concentrate is effective to both maintain the pH and to maintain the blended fluid concentrate with high levels of dairy proteins and coffee in a pourable and liquid form. By one approach, the preferred stabilizing components are phosphate salts (and most preferably disodium phosphate), which are believed to be more effective in reducing the drop in pH that generally occurs during sterilization.

It has been discovered that a relatively narrow range of the stabilizer component relative to the coffee solids is effective to produce concentrates that remain fluid over extended shelf lives with the increased protein amounts when starting with an ultrafiltered dairy source. On the other hand, too little or too much of the stabilizing component relative to the coffee solids results in a non-pourable or gel-like concentrate. To this end, it has also been discovered that the effective range of the stabilizing component relative to the coffee solids unexpectedly narrows as the percent coffee in the concentrate increases.

By one approach, the blended dairy and coffee concentrate may include a total solids of about 30 percent or greater, and include a concentrated fluid dairy component and about 2 to about 6 percent coffee solids. The concentrated fluid dairy component may have about 12 to about 20 percent total dairy solids including non-fat dairy solids with an amount of dairy proteins and an amount of lactose. The concentrated fluid dairy component may also have at least about 90 percent dairy protein based on the non-fat dairy solids and less than about 9 percent lactose based on the non-fat dairy solids. By one approach, the concentrated fluid dairy component may be obtained from the ultrafiltration of a liquid dairy source. As mentioned above, the concentrates herein also include an effective amount of a stabilizing salt so that the blended dairy and coffee concentrate remains a pourable fluid after subjecting the blended dairy and coffee concentrate to heat treatment. The effective range of a ratio of the coffee solids to the stabilizing salt varies within a narrowing range defined by the boundaries between about 5.8:1 to about 3.3:1 at about 2 percent coffee, about 5.4:1 to about 3.4:1 at about 3 percent coffee, about 5.0:1 to about 3.5:1 at about 4 percent coffee, about 4.4:1 to about 3.6:1 at about 5 percent coffee, and about 4.8:1 to about 4.3:1 at about 6 percent coffee and all ratios therebetween.

By another approach, the blended fluid concentrate may include about 12 to about 20 percent of the ultrafiltered dairy solids (preferably about 17 to about 19 percent), about 2 to about 6 percent of the coffee component, and about 0.2 to less than about 1.5 percent of the stabilizing component (preferably about 0.6 to about 1.4 percent). Such concentrates remain a pourable and stable liquid throughout heat treatments and an extended shelf life. In such form, the blended fluid concentrate generally has about 7 to about 11 percent dairy protein (preferably about 10 to about 11 percent dairy protein) and less than about 1 percent lactose. Based on the non-fat dairy solids, the blended fluid concentrate may include at least about 90 percent protein (preferably at least about 94 percent protein) relative to the non-fat dairy solids and less than about 9 percent lactose (preferably less than about 5 percent lactose) relative to the non-fat dairy solids. Overall, the blended concentrates may have a total solids of at least about 30 percent and, preferably, about 32 to about 40 percent.

DETAILED DESCRIPTION

Figure 1:
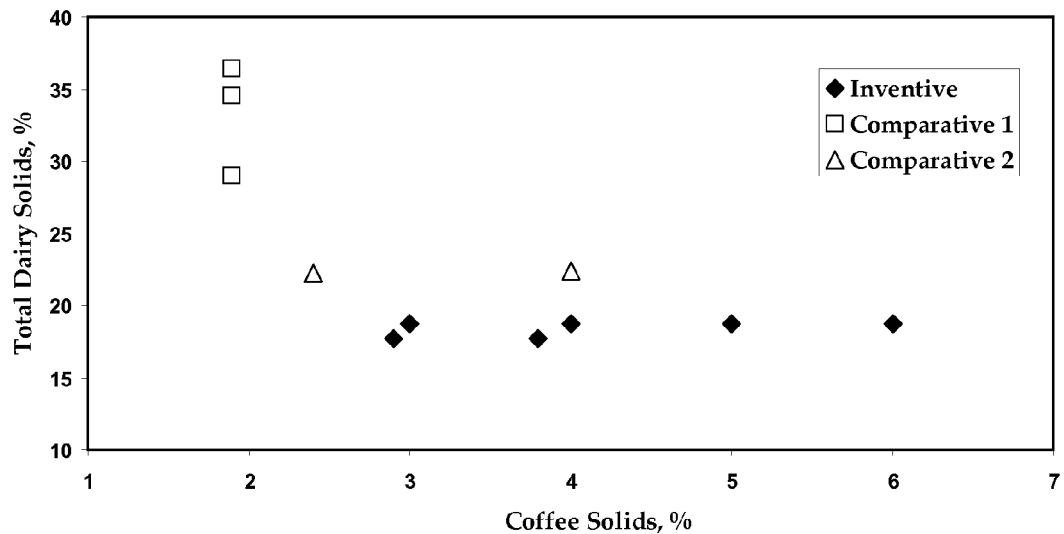
FIG. 1 is a plot of percent dairy solids against percent coffee solids in fluid dairy plus coffee concentrates.

Blended fluid concentrates are provided that can be reconstituted to form an instant coffee plus dairy beverage using either hot or cold liquids. The blended fluid concentrates may include a blend of a fluid dairy component, a coffee component, a stabilizing/buffering component, and optional mouthfeel enhancers in amounts effective to provide a process stable and shelf-stable pourable liquid.

In one aspect, the blended fluid concentrates have an increased dairy protein content relative to the non-fat dairy solids and a lower amount of dairy sugars and minerals relative to the non-fat dairy solids as compared to prior concentrates. The blended fluid concentrates also generally have an increased amount of the coffee component relative to the protein levels, but even with such increased protein and coffee amounts, the blended fluid concentrates described herein still remain stable and pourable after sterilizing heat treatments and during an extended shelf life of the product.

In other aspects, the fluid dairy component may be provided by an ultrafiltered and, preferably, an ultrafiltered and diafiltered dairy source. The stabilizing component may be provided in an amount effective to maintain the pH and to maintain the blended fluid concentrate in a pourable and liquid form. It has been discovered that a relatively narrow range of the stabilizing component relative to the coffee solids is effective to maintain the beverage in a fluid condition. Too little or too much of the stabilizing component relative to the coffee solids results in a non-pourable or gel-like concentrate. To this end, it has also been discovered that the effective range of the stabilizing component relative to the percent coffee generally narrows as the percent coffee increases. As a result, the blended fluid concentrates herein generally have relatively low amounts of stabilizing and bulking agents compared to existing concentrates, and may also be substantially free of or contain only insignificant amounts of other fluidity enhancing agents typically used in the prior concentrates, such as coffee aroma concentrates, gums, emulsifiers, and the like. The blended fluid concentrates herein, therefore, provide a concentrated coffee and dairy beverage that more closely resembles a traditional coffee product having a fresh dairy component.

As mentioned above, the fluid dairy component is preferably obtained from an ultrafiltered and, most preferably, an ultrafiltered and diafiltered liquid dairy source, such as a milk source. One suitable process to prepare the fluid dairy component is described in U.S. application Ser. No. 11/186,543, which is incorporated herein by reference in its entirety. Another suitable process to prepare the fluid dairy component is described in U.S. application Ser. No. 12/203,051, which is also incorporated herein by reference in its entirety. However, other ultrafiltration and diafiltration processes may also be used as needed for a particular application.

When the blended fluid concentrate using the ultrafiltered dairy milk is reconstituted, because the fluid dairy component is obtained from a liquid dairy source that has not gone through a condensing or evaporating process, the resulting coffee plus dairy beverage exhibits fresh, milky, and/or creamy dairy notes similar to traditional coffee products with fresh milk or cream added therein. In addition, because the fluid dairy component has been ultrafiltered and diafiltered to remove lactose and other minerals, the blended fluid concentrate can include increased amounts of dairy proteins relative to the coffee solids and non-fat dairy solids and still remain stable during heat treatment and throughout an extended shelf life in a highly concentrated form. With reduced levels of lactose, the blended fluid concentrates herein are generally not subject to the browning and other undesirable effects found in prior concentrates having high levels of lactose.

Preferably, the blended fluid concentrate can include about 12 to about 20 percent of the ultrafiltered dairy solids (most preferably about 17 to about 19 percent), about 1.6 to about 6 percent of the coffee component (most preferably about 2 to about 6 percent), and less than about 1.5 percent of the stabilizing component (preferably about 0.2 to about 1.4 percent and, most preferably, about 0.6 to about 1.4 percent). The liquid concentrates may also include other optional components, such as fats, sweeteners, flavoring agents, bulking agents, and/or other ingredients as needed for a particular product. For example, the liquid concentrate may also include about 0 to about 16 percent fat, about 0.3 to about 1.0 percent sodium chloride, about 3 to about 23 percent sucrose, and/or about 0 to about 0.1 flavoring agents. It will be appreciated, however, that such amounts may vary depending on the particular application and starting raw materials used.

The blended fluid concentrates remain shelf stable as a pourable liquid and can be sterilized as a single, blended concentrate rather than separately sterilizing the dairy component and the coffee component. For example, the blended fluid concentrates herein remain stable as a fluid or pourable liquid for at least about 5 months, preferably, at least about 9 months, and, most preferably, at least about 12 to about 18 months. As used herein, "stable" is intended to mean the period of time at which the blended fluid concentrates can be stored at about 70 to about 75° F and remain as a blended, pourable liquid without developing objectionable organoleptic characteristics such as an objectionable aroma, appearance, taste, consistency or mouthfeel. In addition, a stable blended fluid concentrate at a given shelf life will be substantially free of any strong color changes, gelling, aggregation, and/or flocculation of particles upon being subjected to heat and/or extended shelf storage.

As used herein, total dairy solids refers to the total of the dairy fat and solid-non-fat dairy contents of the fluid dairy component. The solid-non-fat dairy contents include at least dairy proteins, lactose, minerals (i.e., sodium salts, calcium salts, and the like), acids, enzymes, and/or vitamins and the like. The dairy proteins may generally include casein and/or whey, which may include any, or all, of the phosphoproteins in dairy liquids as well as mixtures thereof. Casein may include, for example, $\alpha$-casein (including $\alpha_{s_1}$-casein and $\alpha_{s_2}$-casein), $\beta$-casein, $\gamma$-casein, $\kappa$-casein, and/or their genetic variants and the like.

The fluid dairy component can be obtained from any dairy liquid having lactose, fat, protein, minerals, and water. The fluid dairy component may also include acids, enzymes, gases, and vitamins. The fluid dairy component originate from cow's milk such as whole milk, reduced-fat milk, low-fat milk, or skim milk. Whole milk means not less than about 3.25 percent milk fat, reduced-fat milk means about 2 percent milk fat, low-fat milk means about 1 percent milk fat, fat-free or skim milk means less than about 0.2 percent milk fat. It is preferred that the fluid dairy component originate from reduced-fat milk. In one aspect, the fluid dairy component is obtained from 2 percent reduced fat milk, and ultrafiltered and diafiltered to a liquid concentrate having a total solids of at least about 30 percent and, in some cases, about 32 to about 40 percent total solids, which contain less than about 1 percent lactose. This low level of lactose is in contrast to the prior concentrates that contain more than about 50 percent lactose (relative to non-fat milk solids).

With ultrafiltration and diafiltration, the fluid dairy component described herein has an increased amount of dairy proteins, such as casein and whey proteins, and reduced amounts of other non-fat dairy components, such as sugars (lactose), minerals and the like, relative to the non-fat dairy solids in the concentrate. As a result, the blended fluid concentrates herein can include higher amounts of dairy proteins (relative to the coffee solids and non-fat dairy solids) without a corresponding increase in lactose and other dairy sugars such as would occur with prior concentrated instant beverages using condensed or evaporated milk. By increasing the amount of dairy protein and reducing the amount of other non-fat dairy components, a larger degree of concentration can be achieved in a heat and shelf stable product. While not wishing to be limited by theory, it is believed that some of the minerals and sugars in the dairy solids can cause aggregation of the milk proteins upon sterilization. In addition, because the blended fluid concentrates are generally limited in the total amount of solids that can be stably incorporated therein and still remain liquid (in some cases, up to about 40 percent total solids), the blended fluid concentrates described herein include greater amounts of protein solids relative to the total solids in the concentrates, which provide more of the desired ingredients (i.e., proteins) and reduced amounts of the less desired ingredients (i.e., sugars) in a concentrated liquid form.

In particular, one preferred ultrafiltration and diafiltration process utilizes 2 percent milk as the starting dairy source and concentrates the dairy solids so that it results in a concentrate generally having about 7 to about 11 percent dairy protein (preferably about 10 to about 11 percent dairy protein). Based on the total dairy solids in the concentrate, the resultant blended fluid concentrate including the dairy component obtained from ultra-filtration may include at least about 50 percent protein (preferably about 55 percent protein) relative to the total dairy solids. Relative to the non-fat dairy solids, such ultrafiltered concentrates may also include at least about 90 percent protein (preferably about 94 percent protein) relative to the non-fat dairy solids. Prior concentrates, on the other hand, generally include only about 26 percent protein relative to the total dairy solids or about 37 percent protein relative to the non-fat dairy solids.

The fluid dairy component also includes a reduced amount of other non-fat dairy components, such as sugars, minerals, and the like. Specifically, one preferred ultrafiltration and diafiltration process utilizing 2 percent milk as the starting dairy source concentrates the dairy component to form a concentrate including a reduced amount of lactose, calcium, sodium, and the like. For example, one form of the blended fluid concentrate has less than about 1 percent lactose (preferably, less than about 0.8 percent lactose). That is, the dairy component may include less than about 5 percent lactose based on the weight of the total dairy solids or, based on the weight of the non-fat dairy components, less than about 8.5 percent lactose (preferably, less than about 5 percent lactose). In addition, sodium may be reduced by about 50 percent, and potassium may be reduced by about 70 percent; however, decreases in mineral levels may vary depending on the process parameters and the particular application. Prior concentrates, on the other hand, generally include greater than about 40 percent lactose relative to the total dairy solids and, relative to the non-fat dairy solids, greater than about 50 percent lactose relative. As discussed in the background, increases in the protein level of prior concentrates will also result in substantial increases in lactose. With the concentrates herein having such low levels of lactose, increases in protein do not result in large increases in lactose.

As mentioned previously, it is preferred that the fluid dairy component is supplied from an ultrafiltered dairy liquid and, more preferably, from an ultrafiltered and diafiltrated dairy liquid. One process to prepare the concentrated dairy liquid is described in co-pending U.S. application Ser. No. 11/186, 543, which is incorporated herein in its entirety by reference. In such process, the ultrafiltration step concentrates the dairy liquid to the desired amount, and the subsequent diafiltration step removes sugars, minerals and other components that can result in aggregation of the dairy proteins upon sterilization. However, other ultrafiltration and diafiltration processes may be used depending on the particular formulation and application.

More specifically, one method of forming the dairy component includes first forewarming a dairy liquid, such as cow's milk, at a temperature of at least about 60° C. for a time sufficient (generally about 30 seconds or more) to form a forewarmed dairy liquid having a reduced level of at least about 25 percent of pH 4.6 soluble protein. In one particular application, the forewarming is completed at temperatures between about 60° C. (140° F.) to about 90° C. (194° F.) for between about 30 seconds to about 300 seconds. Next, the forewarmed dairy liquid is concentrated to form a first intermediate dairy liquid having at least about 8.5 percent total protein. The concentration is carried out using ultrafiltration with or without diafiltration. Then, the coffee component, stabilizers and/or mouthfeel enhancers are added to the first intermediate dairy liquid to form a second intermediate dairy liquid. The second intermediate dairy liquid is then sterilized as a single blended, coffee and dairy concentrate at a temperature and for a time sufficient to obtain the stable blended fluid concentrated, wherein the blended fluid concentrate has a $F_0$ (sterilization value) of at least about 5. By one approach, the sterilization is carried out by first heating the second intermediate dairy liquid to a temperature of about 118° C. (244° F.) to about 145° C. (293° F.) within about 1 second about 30 minutes and, secondly, maintaining the heated second intermediate dairy liquid at a temperature at about 118° C. (244° F.) to about 145° C. (293° F.) for about 1.5 seconds to 15 minutes. However, other sterilization heat treatments may also be used depending on the particular application.

If desired, the concentrated dairy liquid can be homogenized prior to further processing. If also desired, the second intermediate dairy liquid can be standardized prior to the sterilization step. Such a standardization step would allow less exacting control over the ultrafiltration (with or without diafiltration) step since standardization of the second intermediate dairy liquid could correct for variations in the concentration level of the first intermediate dairy liquid from the ultrafiltration step.

Using ultrafiltration with or without diafiltration to prepare a concentrate will generally result in a total solids content of about 12 to about 40 percent. With such concentration methods, a significant amount of the lactose and minerals are removed during the concentration step. The concentrated dairy liquids of this invention preferably contain at least about 7 percent protein and, most preferably, about 7 to about 11 percent protein as well as about 1 percent or less lactose.

After the fluid dairy component is ultrafiltered and diafiltered, the coffee component is blended therein. By one approach, the coffee component is coffee solids or a concentrated coffee liquid. Preferably, the coffee solids can be mixed into the dairy component using sufficient mixing to disperse the coffee solids uniformly into the fluid dairy component. It is preferred that the mixing not cause foaming of the dairy component. By one approach, the blending of the coffee component and dairy component may be performed at between about 21° C. (70° F.) and about 60° C. (140° F.).

The coffee component is preferably the soluble extracts of roast and ground coffee and, most preferably, soluble coffee solids wherein the blended fluid concentrate has about 2 to about 6 percent of the coffee solids. The soluble coffee can be obtained from any traditional thermal method of manufacturing such soluble coffee. For example, suitable soluble coffee can be obtained by first grinding coffee beans, extracting the soluble components of the ground bean, separating the soluble coffee product, and then drying of the separated product into a fine powder. By one approach, soluble coffee solids are generally obtained by the coarse grinding of a roasted coffee bean followed by a high-temperature, high-pressure extraction of the soluble coffee components. Of course, other methods of obtaining the soluble coffee may also be used. Alternatively, the coffee component or coffee solids may also be obtained from a concentrated coffee extract liquor.

The blended fluid concentrate also includes the stabilizer component, which is preferably a stabilizer or buffering salt, in an amount effective to maintain the desired pH and to maintain the blended fluid concentrate in a liquid and pourable form. By one approach, the stabilizer component can be added to the dairy component after ultrafiltration and prior to blending in the coffee solids. However, all dry ingredients (stabilizer salt, mouthfeel enhancers, and/or coffee solids) could also be preblended and the blend added to the ultrafiltered dairy component. By one approach, the stabilizer component is added in an amount so that the blended fluid concentrate maintains a pH from about 6.4 to about 6.5, and maintains a pourable form having a viscosity from about 70 to about 2200 cps (spindle 27 @ about 100 RPM after about 2 minutes of shear). However, the pH and viscosity of a stable, pourable liquid may vary depending on the composition and degree of concentration for a particular application.

As mentioned previously, it has been discovered that a relatively narrow range of the stabilizer component relative to the coffee solids is effective to maintain a heat stable and shelf stable product. Too much or too little of the stabilizer component relative to the amount of coffee results in a non-pourable concentrate that is custard- or gel-like. In addition, it has also been discovered that the effective range of stabilizer component relative to the coffee component generally narrows as the amount of coffee solids increases.

By one approach, effective amounts of the stabilizer component in the blended fluid concentrate are generally less than about 1.5 percent, preferably about 0.2 to about 1.4 percent and, most preferably, between about 0.6 to about 1.4 percent. While not wishing to be limited by theory, it is believed that this relatively narrow range of stabilizer helps to maintain a fluid concentrate in the presence of the acidic coffee component by balancing the acidic pH of the coffee and buffering against a pH decrease during sterilization. It is believed that not enough stabilizer would permit the coffee solids to decrease the pH and cause flocculation or dairy particles dropping out of solution. On the other hand, it is also believed that too much stabilizer may disrupt mineral-protein interactions resulting in a thick fluid.

Figure 3:
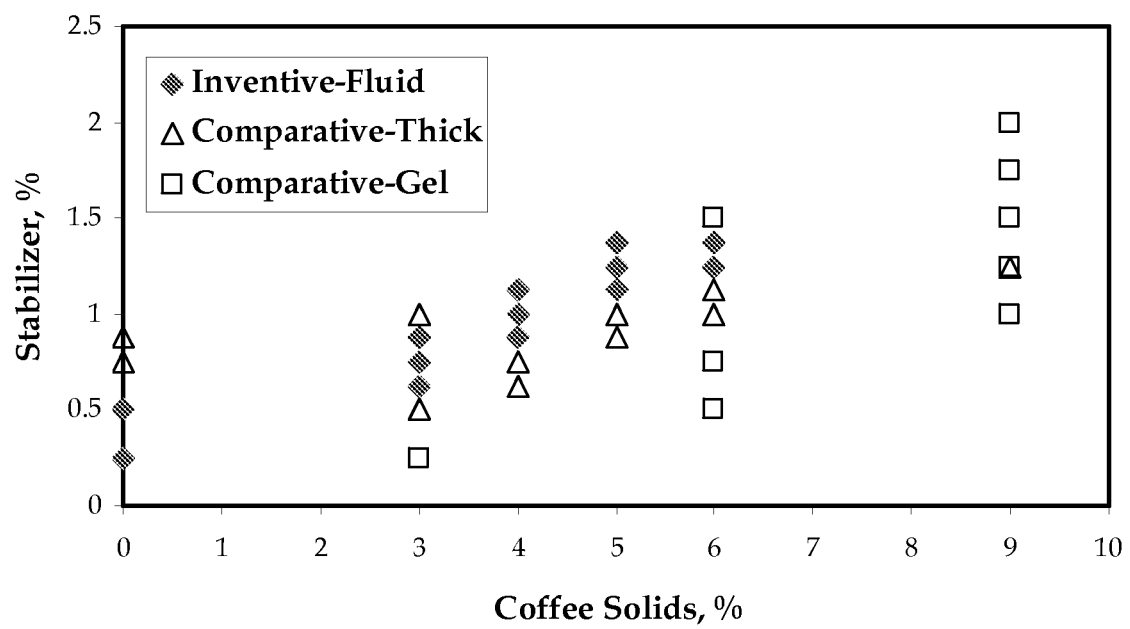
FIG. 3 is a plot of percent stabilizer component against percent coffee in dairy plus coffee concentrates.

It has also been discovered that the effective amount of the stabilizer component generally depends on the total amount of the coffee component in the blended fluid concentrate. Preferably, to maintain a pourable and liquid concentrate, the blended fluid concentrates herein contain less than about 1.5 percent stabilizer, as described above, and also a ratio of the coffee component to the stabilizer component from about from about 5.8:1 to about 3.3:1 within a narrowing range as the amount of coffee solids increases. For example, the ratio of coffee solids to stabilizer component preferably falls within a narrowing range from about 5.8:1 to about 3.3:1 at about 2 percent coffee, about 5.4:1 to about 3.4:1 at about 3 percent coffee, about 5.0:1 to about 3.5:1 at about 4 percent coffee, about 4.4:1 to about 3.6:1 at about 5 percent coffee, and about 4.8:1 to about 4.3:1 at about 6 percent coffee and within the space between these limits. This preferred narrowing range is generally illustrated in FIG. 3. Ratios outside this defined space generally result in either a thick, custard like concentrate or a gel-like concentrate. Such textures are generally undesired in a concentrate configured to form an instant beverage because consumers expect a fluid product and associate thick custards and gels with a questionable product.

Suitable stabilizer components include buffering salts such as disodium phosphate, trisodium phosphate, dipotassium phosphate, tripotassium phosphate, and di-, tri-sodium and potassium salts of citrate. Most preferably, the stabilizer component is disodium phosphate because it more effectively reduces the drop in pH that commonly occurs to concentrates during sterilization.

The blended fluid concentrate may also include optional ingredients as needed to achieve desired tastes, flavors, textures, mouthfeel, and other organoleptic properties. For example, the blended fluid concentrate may contain small amounts of sodium chloride as needed to achieve the desired mouthfeel of the fluid dairy component. In some cases, without sodium chloride the fluid dairy component may tend to be too watery due to the removal of the dairy source's minerals. By one approach, the blended fluid concentrate may also contain between about 0.3 and about 1.0 percent sodium chloride. Sweeteners, such as sucrose, can also be added to provide the desired sweetness due to the fact the lactose has been washed out during the concentration process. For example, the blended fluid concentrate may also contain between about 3 and about 23 percent sucrose, which is still substantially less than the amount of lactose that exists in prior concentrates using evaporated or condensed milk as the dairy component. If desired alternative sweeteners can also be used, such as artificial sweeteners, corn syrups, sugar alcohols, and the like.

Advantages and embodiments of the concentrates described herein are further illustrated by the following examples; however, the particular conditions, processing schemes, materials, and amounts thereof recited in these examples, as well as other conditions and details, should not be construed to unduly limit this method. All percentages are by weight unless otherwise indicated.

EXAMPLES

Example 1

Figure 2:
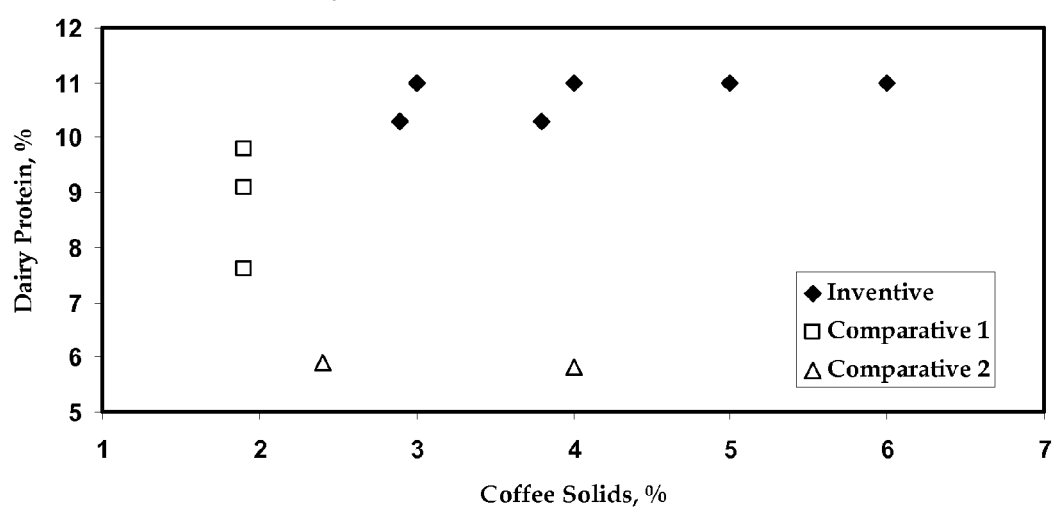
FIG. 2 is a plot of percent dairy protein against percent coffee solids in fluid dairy plus coffee concentrates.

An analysis was conducted to determine the total dairy solids, total dairy protein, and total coffee solids capable of being blended in a liquid dairy plus coffee concentrate that still remained fluid after heat treatment. The samples tested are illustrated in Table 1 below, and the results of the comparison are provided in the charts of FIGS. 1 and 2. FIG. 1 plots percent total dairy solids against percent coffee solids in concentrates that remained fluid, and FIG. 2 plots percent dairy protein against percent coffee solids in concentrates that remained fluid. The data shown on the graphs of FIGS. 1 and 2 and in Table 1 below illustrate inventive and comparative samples that remained liquid after heat treatment of about 11 minutes at 123° C. (253° F.) and about 30-33 MPa.

TABLE 1

Samples Evaluated (All samples formed a pourable fluid concentrate)

|  | Inventive | | | | | | Comparative 1 | | | Comparative 2 | |
| --- | --- | --- | --- | --- | --- | --- | --- | --- | --- | --- | --- |
|  | 1 | 2 | 3 | 4 | 5 | 6 | 1 | 2 | 3 | 4 | 5 |
| Dairy Source | UF and Diafiltered Milk | | | | | | NFDM and Cream | | | While Milk, NFDM, and Cream | |
| Total Solids | 33.6 | 34.7 | 35.2 | 36.4 | 37.7 | 39.4 | 54.7 | 56.1 | 60.5 | 41.1 | 43.5 |
| Coffee Solids, % | 2.9 | 3.8 | 3 | 4 | 5 | 6 | 1.9 | 1.9 | 1.9 | 2.4 | 4 |
| Fat, % | 6.7 | 6.7 | 7.1 | 7.1 | 7.1 | 7.1 | 10 | 12 | 12 | 7.8 | 7.8 |
| Dairy Protein, % | 10.3 | 10.3 | 11.0 | 11.0 | 11.0 | 11.0 | 7.6 | 9.8 | 9.1 | 5.9 | 5.8 |

TABLE 1-continued

Samples Evaluated (All samples formed a pourable fluid concentrate)

|  | Inventive | | | | | | Comparative 1 | | | Comparative 2 | |
| --- | --- | --- | --- | --- | --- | --- | --- | --- | --- | --- | --- |
|  | 1 | 2 | 3 | 4 | 5 | 6 | 1 | 2 | 3 | 4 | 5 |
| Lactose, % | 0.73 | 0.73 | 0.65 | 0.65 | 0.65 | 0.65 | 11.3 | 14.5 | 13.5 | 8.6 | 8.6 |
| Dairy Solids, % | 17.7 | 17.7 | 18.7 | 18.7 | 18.7 | 18.7 | 29.0 | 36.4 | 34.5 | 22.2 | 22.4 |
| Dairy Protein as % of Total Dairy Solids (Dry Basis) | 58.2 | 58.2 | 58.8 | 58.8 | 58.8 | 58.8 | 26.3 | 26.9 | 26.3 | 26.6 | 26.6 |
| Lactose as % of Total Dairy Solids (Dry Basis) | 4.1 | 4.1 | 3.5 | 3.5 | 3.5 | 3.5 | 39.2 | 40 | 39.1 | 38.7 | 37.8 |
| Dairy Protein as % of Non-Fat Dairy Solids (Dry Basis) | 93.4 | 93.4 | 94.4 | 94.4 | 94.4 | 94.4 | 40.2 | 40.3 | 40.2 | 40.7 | 40.2 |
| Lactose as % of Non-Fat Dairy Solids (Dry Basis) | 6.6 | 6.6 | 5.5 | 5.5 | 5.5 | 5.5 | 59.8 | 59.6 | 59.7 | 59.3 | 59.7 |
| Observation | Fluid | Fluid | Fluid | Fluid | Fluid | Fluid | Fluid | Fluid | Fluid | Fluid | Fluid |

The inventive samples 1 through 6 included UF/Diafiltered milk first prepared by forewarming 2 percent milk at 194° F. for 300 seconds followed by ultrafiltration with diafiltration to approximately 25 percent solids with less than 1 percent lactose and finally homogenizing the concentrate at 2000 psi. The blended dairy/coffee concentrates of samples 1 to 6 were then prepared by first combining the concentrated milk with sugar, sodium chloride, and disodium phosphate, and then mixing until all solids were dissolved. Next, the coffee solids were mixed until dissolved. These samples also included a total solids of greater than about 30 percent, between about 3.3 and about 14.5 percent sucrose, about 0.2 to about 1.375 percent disodium phosphate (DSP), about 0.3 to about 0.9 percent sodium chloride, and up to about 0.15 percent flavor additive. The sucrose and sodium chloride were varied to adjust mouthfeel and sweetness.

The comparative samples 1 through 3 included a dairy component of non-fat dry milk (NFDM) and cream prepared by combining water, cream, NFDM, and sugar at 140° F. until all solids were dissolved. Next, the mixture was homogenized at 1500 psi. The concentrates of comparative samples 1 to 3 were then prepared by mixing in the DSP and coffee solids until fully dissolved. These samples also included between about 16 and about 23 percent sucrose, about 0.74 to about 0.97 percent disodium phosphate, and up to about 0.1 percent flavor.

The comparative samples 4 and 5 included a dairy component including whole milk, NFDM, and cream prepared by combining water, cream, whole milk, sugar, and DSP and mixing until all solids were dissolved. Coffee solids were then added and mixed until dissolved. Finally, the mixture was homogenized at 1500 psi. These samples also included about 14.6 percent sucrose, about 0.75 to about 1 percent disodium phosphate. The comparative samples 4 and 5 also have a limited shelf life that precipitates agglomerates after only about three months of shelf life.

As can be seen in Table 1 and FIG. 1, the comparative samples all have a higher dairy solids than the inventive samples, but the dairy solids in the comparative samples is mainly lactose, which has largely been removed from the inventive samples due to the ultrafilteration and diafiltration process. As also shown in Table 1 and FIG. 2, the inventive samples have both a higher percentage of dairy protein (with a lower level of lactose) and a higher level of coffee solids than is capable of being prepared in a fluid concentrate of the comparative samples (with a higher level of lactose). As a result, the higher concentrations of coffee and dairy protein in the inventive samples allows for a greater degree of concentration without compromising creamy dairy flavor and mouthfeel or a diluted coffee taste and aroma.

Example 2

An analysis was conducted to determine the effect of varying the amount of soluble coffee and disodium phosphate levels on the texture of the final sterilized concentrate after subjecting the samples to a heat treatment of 11 minutes at 123° C. (253° F.) and 30-33 MPa. All concentrates in this Example included ultrafiltered and diafiltered milk prepared by forewarming two percent milk at 194° F. for 300 seconds followed by ultrafiltration with diafiltration to approximately 25 percent solids with less than 1 percent lactose and finally homogenization at 2000 psi. The concentrates in this Example further included about 7 percent fat, about 11 percent dairy protein, about 0.6 percent lactose, about 0.9 percent sodium chloride, and about 10 percent sucrose. The samples had a total dairy solids of about 18 percent so that the concentrate had about 58 percent dairy protein and about 3 percent lactose based on the weight of the total dairy solids or about 94 percent dairy protein and about 5 percent lactose based on the weight of the non-fat dairy solids. Each blended dairy plus coffee concentrate was prepared by first combining concentrated milk, sugar, sodium chloride, and DSP and mixing until all solids were dissolved. Then, the coffee solids were added and mixed until dissolved.

A plot of percent coffee solids against percent disodium phosphate is provided in FIG. 3. As shown in FIG. 3 and Tables 2 through 5 below, depending on the level of coffee solids, the amount of disodium phosphate affected the texture of the final sterilized product. In general, when using less than about 1.5 percent disodium phosphate and coffee solids between about 3 and 6 percent, a ratio of coffee to disodium phosphate from about 5.8:1 to about 3.3:1 results in a fluid concentrate after sterilization. As also discovered, the range of acceptable ratios narrows as percent coffee increases. Ratios outside this range resulted in non-fluid concentrates.

TABLE 2A

Coffee and Disodium Phosphate Levels (Inventive Samples)

| | Inventive Samples | | | | | | | | | | |
|---|---|---|---|---|---|---|---|---|---|---|---|
| | 1 | 2 | 3 | 4 | 5 | 6 | 7 | 8 | 9 | 10 | 11 |
| Total Solids | 36.5 | 36.4 | 36 | 36 | 36.1 | 36.2 | 38.2 | 37.2 | 38.3 | 38.9 | 38.4 |
| Coffee, % | 3 | 3 | 3 | 4 | 4 | 4 | 5 | 5 | 5 | 6 | 6 |
| DSP, % | 0.625 | 0.75 | 0.875 | 0.875 | 1.0 | 1.125 | 1.125 | 1.25 | 1.375 | 1.25 | 1.375 |
| Coffee:DSP Ratio | 4.8 | 4.0 | 3.4 | 4.5 | 4.0 | 3.5 | 4.4 | 4.0 | 3.6 | 4.8 | 4.3 |
| pH (pre-retort) | 6.4 | 6.5 | 6.5 | 6.4 | 6.5 | 6.5 | 6.4 | 6.5 | 6.5 | 6.4 | 6.5 |
| pH (post-retort) | 6 | 6.0 | 6.0 | 5.9 | 6.0 | 6.1 | 5.9 | 6.0 | 6.0 | 5.9 | 6.0 |
| Viscosity, cp (post retort) | 387 | 420 | 455 | 545 | 512 | 690 | 1715 | 1490 | 2082 | 2008 | 2165 |
| Observation (1 day after sterilization) | Fluid | Fluid | Fluid | Fluid | Fluid | Fluid | Fluid | Fluid | Fluid | Fluid | Fluid |

TABLE 2B

Coffee and Disodium Phosphate Levels (Inventive Samples)

| | Inventive Samples | |
|---|---|---|
| | 12 | 13 |
| Total Solids | 37.65 | 34.7 |
| Coffee, % | 2.9 | 3.8 |
| DSP, % | 0.54 | 0.75 |
| Coffee:DSP Ratio | 5.3 | 5.0 |
| pH (pre-retort) | 6.40 | 6.46 |
| pH (post-retort) | 5.94 | 5.94 |
| Viscosity, cp (post retort) | 985 | 660 |
| Observation (1 day after sterilization) | Fluid | Fluid |

TABLE 3

Coffee and Disodium Phosphate Levels (Comparative Samples)

| | Comparative Samples | | | | | | |
|---|---|---|---|---|---|---|---|
| | 1 | 2 | 3 | 4 | 5 | 6 | 7 |
| Total Solids | 37.7 | * | 35.7 | 36.4 | 36.4 | 37.7 | 38.7 |
| Coffee, % | 3 | 3 | 3 | 4 | 4 | 5 | 5 |
| DSP, % | 0.25 | 0.5 | 1.0 | 0.625 | 0.75 | 0.875 | 1.0 |
| Coffee:DSP Ratio | 12 | 6 | 3 | 6.4 | 5.33 | 5.71 | 5.0 |
| pH (pre-retort) | 6.32 | 6.4 | 6.64 | 6.34 | 6.39 | 6.32 | 6.37 |
| pH (post-retort) | * | * | 6.1 | * | 5.9 | 5.85 | 5.9 |
| Viscosity, cp (post retort) | * | * | 702 | * | 913 | 1750 | 1325 |
| Observation | Custard | Soft Custard | Thick | Soft Custard | Thick | Soft Custard | Thick |

* Not measured

Some comparative samples in the Examples exhibited post retort viscosities similar to the inventive samples. These comparative samples, however, exhibited shear thinning behavior, which is generally not acceptable. The comparative thick samples exhibited an initial thick visual appearance, which is generally not acceptable.

TABLE 4

Coffee and Disodium Phosphate Levels (Comparative Samples)

| | Comparative Samples | | | | | | |
|---|---|---|---|---|---|---|---|
| | 8 | 9 | 10 | 11 | 12 | 13 | 14 |
| Total Solids | * | * | * | 39.6 | * | 41.69 | * |
| Coffee, % | 6 | 6 | 6 | 6 | 6 | 9 | 9 |
| DSP, % | 0.5 | 0.75 | 1 | 1.125 | 1.5 | 1 | 1.25 |
| Coffee:DSP Ratio | 12 | 8.0 | 6.0 | 5.3 | 4 | 9 | 7.2 |
| pH (pre-retort) | 6.12 | 6.27 | 6.4 | 6.4 | 6.55 | 6.21 | 6.27 |
| pH (post-retort) | * | * | * | 5.86 | * | * | * |

TABLE 4-continued

Coffee and Disodium Phosphate Levels (Comparative Samples)

|  | Comparative Samples | | | | | | |
|---|---|---|---|---|---|---|---|
|  | 8 | 9 | 10 | 11 | 12 | 13 | 14 |
| Viscosity, cp (post retort) | * | * | * | 2263 | * | * | * |
| Observation | Custard Gel | Soft Custard | Soft Custard | Thick | Soft. Gritty Gel | Custard | Soft Custard |

* Not measured

TABLE 5

Coffee and Disodium Phosphate Levels (Comparative Samples)

|  | Comparative Samples | | |
|---|---|---|---|
|  | 15 | 16 | 17 |
| Total Solids | * | * | * |
| Coffee, % | 9 | 9 | 9 |
| DSP, % | 1.5 | 1.75 | 2 |
| Coffee:DSP Ratio | 6 | 5.14 | 4.5 |
| pH (pre-retort) | 6.39 | 6.5 | 6.63 |
| pH (post-retort) | * | * | * |
| Viscosity, cp (post retort) | * | * | * |
| Observation | Softy, Gritty Gel | Soft, Gritty Gel | Soft, Gritty Gel |

* Not measured

Example 3

Additional comparative studies were completed to determine the extent of the acceptable range of coffee to stabilizer ratios by determining what level of stabilizer would form a fluid concentrate with no coffee solids. Concentrates were prepared as in Example 2, but without coffee solids. Disodium phosphate (DSP) levels of 0.25 and 0.5 percent with no coffee solids resulted in a fluid concentrate, while DSP levels of 0.75, 0.875, and 1.0 percent resulted in a concentrate that was too thick. These results are also shown in FIG. 3. As a result, it was expected that the downward trend of coffee to stabilizer ratios as shown in FIG. 3 would apply to coffee levels below the 3 percent tested in Example 2 so that at about 2 percent coffee solids the expected effective ratios would range from about 5.8:1 to about 3.3:1 in a fluid concentrate.

Example 4

A shelf life study was completed on inventive sample 1 from Example 2. After approximately 18 months of room temperature storage (i.e., about 70 to about 75° F.), this sample was observed as still being fluid.

Example 5

A coffee and dairy concentrate produced using the methods described herein was compared to a coffee and dairy concentrate produced using NFDM and cream. Each concentrate was diluted 4 fold in hot water (85° C.) and tasted by an expert panel. The tasting notes of the panel are provided in Table 6 below.

TABLE 6

Comparison Taste Results

|  | Inventive | Comparative |
|---|---|---|
| Milk fat | 1.3% | 1.5% |
| Protein | 2.1% | 1.2% |
| Lactose | 0.15% | 1.72% |
| coffee | 0.8% | 0.8% |
| sucrose | 2.1% | 2.9% |
| Taste notes | Milky, creamy with a good level of mouthcoating. Some sterilized milk notes. Balanced sweetness and coffee notes. | Milky and creamy but with a lower mouthcoat than Inventive. Some cooked and caramel notes detected |

As shown in the Table above, the reconstituted coffee and dairy concentrate made with UF milk per the procedures herein exhibited a better balance, more creamy mouthfeel, and the absence of caramel notes (which is believed to be attributed to lactose reactions during retort of the comparative samples).

Example 6

Comparative samples were prepared used condensed/evaporated milk. These samples did not include any stabilizing gums, coffee oils, and/or coffee aroma constituents. One sample contained commercial sweetened condensed milk (Nestle) and 0.6 percent disodium phosphate with no coffee. This sample gelled after sterilization at 11 minutes at 123° C. (253° F.) and 30-33 MPa. Another sample included sweetened condensed milk (Borden's) and 0.56 percent disodium phosphate and about 5.6 percent coffee. This sample also gelled after the sterilization conditions. Each sample also includes about 7.7 percent fat, 7.7 percent protein, and about 59 percent sugars (about 12 percent of the sugar was lactose, the remainder being added during manufacture of the sweetened condensed milk). Therefore, at the same disodium phosphate levels as used in the blended liquid concentrates starting with ultrafiltered milk that were fluid, these comparative concentrates starting with condensed milk resulted in non-stable and non-fluid beverages.

It will be understood that various changes in the details, materials, and arrangements of the process, formulations, and ingredients thereof, which have been herein described and illustrated in order to explain the nature of the method and resulting concentrate, may be made by those skilled in the art within the principle and scope of the embodied method as expressed in the appended claims.

What is claimed is:

1. A blended dairy and coffee concentrate comprising:
   a total solids of about 30 percent or greater;
   a concentrated fluid dairy component having about 12 to about 20 percent total dairy solids including non-fat dairy solids with an amount of dairy proteins and an amount of lactose, the concentrated fluid dairy component having at least about 90 percent dairy protein based on the non-fat dairy solids and less than about 9 percent lactose based on the non-fat dairy solids;
   about 2 to about 6 percent coffee solids;
   an effective amount of a stabilizing salt so that the blended dairy and coffee concentrate is a pourable fluid after subjecting the blended dairy and coffee concentrate to heat treatment; and
   a ratio of the coffee solids to the stabilizing salt within a narrowing range from about 5.8:1 to about 3.3:1 at about 2 percent coffee solids, about 5.4:1 to about 3.4:1 at about 3 percent coffee solids, about 5.0:1 to about 3.5:1 at about 4 percent coffee solids, about 4.4:1 to about 3.6:1 at about 5 percent coffee solids, and about 4.8:1 to about 4.3:1 at about 6 percent coffee solids, and no glycerine, mono- or diglycerides, carrageenan, pectin or coffee aroma.

2. The concentrate of claim 1, wherein the blended dairy and coffee concentrate has less than about 1.5 percent of the stabilizing salt.

3. The concentrate of claim 2, wherein the blended dairy and coffee concentrate includes about 0.2 to about 1.4 percent of the stabilizing salt.

4. The concentrate of claim 3, wherein the stabilizing salt is selected from the group consisting of disodium phosphate, trisodium phosphate, dipotassium phosphate, tripotassium phosphate, disodium citrate, trisodium citrate, dipotassium citrate, tripotassium citrate, and mixtures thereof.

5. The concentrate of claim 1, wherein the total dairy solids is about 17 to about 18 percent.

6. The concentrate of claim 1, wherein the blended dairy and coffee concentrate includes about 10 to about 15 percent sucrose.

7. The concentrate of claim 1, wherein the concentrated fluid dairy component is supplied from an ultrafiltered dairy liquid.

8. The concentrate of claim 7, wherein the ultrafiltered dairy liquid is subjected to diafiltration.

9. The concentrate of claim 1, wherein the blended dairy and coffee concentrate remains a pourable fluid after a heat treatment of up to about 123° C. for up to about 11 minutes.

10. The concentrate of claim 1, wherein the blended dairy and coffee concentrate remains a pourable fluid for at least about five months of storage between about 70 and about 75° F.

11. A blended dairy and coffee liquid concentrate comprising:
    a total solid of about 30 percent or greater; ultrafiltered dairy components having about 12 to about 20 percent total dairy solids, about 7 to about 11 percent dairy protein, and less than about 1 percent lactose;
    about 2 to about 6 percent coffee solids;
    an effective amount of a buffering salt so that the blended dairy and coffee liquid concentrate is a pourable fluid after being subjected to a sterilizing heat treatment; and
    a ratio of the coffee solids to the buffering salt within a narrowing range from about 5.8:1 to about 3.3:1 at about 2 percent coffee solids, about 5.4:1 to about 3.4:1 at about 3 percent coffee solids, about 5.0:1 to about 3.5:1 at about 4 percent coffee solids, about 4.4:1 to about 3.6:1 at about 5 percent coffee solids, and about 4.8:1 to about 4.3:1 at about 6 percent coffee solids, and no glycerine, mono- or diglycerides, carrageenan, pectin or coffee aroma.

12. The concentrate of claim 11, wherein the liquid concentrate has less than about 1.5 percent of the buffering salt.

13. The concentrate of claim 12, wherein the liquid concentrate includes about 0.2 to about 1.4 percent of the buffering salt.

14. The concentrate of claim 13, wherein the buffering salt is selected from the group consisting of disodium phosphate, trisodium phosphate, dipotassium phosphate, tripotassium phosphate, disodium citrate, trisodium citrate, dipotassium citrate, tripotassium citrate, and mixtures thereof.

15. The concentrate of claim 11, wherein the liquid concentrate includes about 10 to about 15 percent sucrose.

16. The concentrate of claim 11, wherein ultrafiltered dairy component is supplied from ultrafiltered reduced fat milk.

17. The concentrate of claim 11, wherein the ultrafiltered dairy component is subjected to diafiltration.

18. The concentrate of claim 1, wherein the total solids is about 32 to about 40 percent.

19. The concentrate of claim 11, wherein the total solids is about 32 to about 40 percent.

20. A blended dairy and coffee liquid concentrate comprising:
    About 30 to about 40 percent total solids;
    ultrafiltered dairy components having about 12 to about 20 percent total dairy solids, about 7 to about 11 percent dairy protein, and less than about 1 percent lactose;
    about 2 to about 6 percent coffee solids;
    about 0.2 to about 1.4 percent of a buffering salt so that the blended dairy and coffee liquid concentrate is a pourable fluid after being subjected to a sterilizing heat treatment; and
    a ratio of the coffee solids to the buffering salt selected from a narrowing range from about 5.8:1 to about 3.3:1 at about 2 percent coffee solids, about 5.4:1 to about 3.4:1 at about 3 percent coffee solids, about 5.0:1 to about 3.5:1 at about 4 percent coffee solids, about 4.4:1 to about 3.6:1 at about 5 percent coffee solids, and about 4.8:1 to about 4.3:1 at about 6 percent coffee solids, and no glycerine, mono- or diglycerides, carrageenan, pectin or coffee aroma.

21. The concentrate of claim 20, wherein the total solids is about 32 to about 40 percent.

22. The blended dairy and coffee liquid concentrate of claim 11, wherein the blended dairy and coffee liquid concentrate remains a pourable fluid after a heat treatment of up to about 123° C. for up to about 11 minutes.

23. The blended dairy and coffee liquid concentrate of claim 20, wherein the blended dairy and coffee liquid concentrate remains a pourable fluid after a heat treatment of up to about 123° C. for up to about 11 minutes.

* * * * *